(12) United States Patent
Walkowski et al.

(10) Patent No.: US 10,703,197 B2
(45) Date of Patent: Jul. 7, 2020

(54) EXTENSION TUBE INTERNAL CHECK VALVE

(71) Applicant: Eaton Corporation, Cleveland, OH (US)

(72) Inventors: Paul D. Walkowski, Ann Arbor, MI (US); Robert A. Dayton, Attica, MI (US)

(73) Assignee: Eaton Corporation, Cleveland, OH (US)

( * ) Notice: Subject to any disclaimer, the term of this patent is extended or adjusted under 35 U.S.C. 154(b) by 261 days.

(21) Appl. No.: 15/434,746

(22) Filed: Feb. 16, 2017

(65) Prior Publication Data

US 2017/0158049 A1    Jun. 8, 2017

Related U.S. Application Data

(63) Continuation of application No. PCT/US2015/045056, filed on Aug. 13, 2015.

(60) Provisional application No. 62/039,014, filed on Aug. 19, 2014, provisional application No. 62/203,699, filed on Aug. 11, 2015.

(51) Int. Cl.
*B60K 15/04* (2006.01)
*F02M 37/00* (2006.01)

(52) U.S. Cl.
CPC ........ *B60K 15/04* (2013.01); *B60K 2015/047* (2013.01); *B60K 2015/0461* (2013.01); *B60K 2015/0477* (2013.01); *B60Y 2304/05* (2013.01); *B60Y 2304/078* (2013.01); *F02M 37/0023* (2013.01)

(58) Field of Classification Search
CPC .... B60K 2015/0429; B60K 2015/0461; B60K 2015/047; B60K 2015/0346; B60K 2015/045; B60K 15/04
See application file for complete search history.

(56) References Cited

U.S. PATENT DOCUMENTS

| | | | | |
|---|---|---|---|---|
| 4,825,902 A | * | 5/1989 | Helms | E21B 21/10 137/515 |
| 7,246,642 B2 | * | 7/2007 | Foltz | B60K 15/04 141/285 |

(Continued)

FOREIGN PATENT DOCUMENTS

| | | |
|---|---|---|
| CN | 1608910 A | 4/2005 |
| CN | 101678761 A | 3/2010 |

(Continued)

OTHER PUBLICATIONS

Chinese Office Action for CN Application No. 201510511336.9 dated Sep. 30, 2018, 11 pages.
European Search Report for EP Application No. 15833134.8 dated Mar. 16, 2018, 10 pages.
International Search Report and Written Opinion for International Application No. PCT/US2015/045056 dated Nov. 19, 2015, 14 pages.

*Primary Examiner* — Timothy P. Kelly
(74) *Attorney, Agent, or Firm* — RMCK Law Group PLC

(57) ABSTRACT

A fuel filler tube housing assembly constructed in accordance to one example of the present disclosure includes a fuel filler neck and a filler extension tube. The fuel filler neck housing includes a first mounting structure operable to support a check valve. The fuel filler extension tube is fixed to the fuel filler neck housing and has a second mounting structure substantially similar to the first mounting structure and thereby also operable to support the check valve.

6 Claims, 4 Drawing Sheets

(56) References Cited

U.S. PATENT DOCUMENTS

| | | | |
|---|---|---|---|
| 2003/0116202 A1* | 6/2003 | Krishnamoorthy | B60K 15/04 137/593 |
| 2004/0231728 A1 | 11/2004 | Martin et al. | |
| 2007/0261742 A1 | 11/2007 | Pozgainer | |
| 2008/0257426 A1* | 10/2008 | Spink | B60K 15/04 137/527 |
| 2011/0079322 A1* | 4/2011 | Beier | B60K 15/0406 141/350 |
| 2011/0259447 A1 | 10/2011 | Ishizaka | |
| 2012/0217240 A1 | 8/2012 | Dutzi et al. | |
| 2012/0228292 A1* | 9/2012 | Doble | B60K 15/04 220/86.2 |
| 2013/0213963 A1 | 8/2013 | Chretien et al. | |

FOREIGN PATENT DOCUMENTS

| | | |
|---|---|---|
| CN | 102712252 B | 10/2012 |
| CN | 203172426 U | 9/2013 |
| CN | 101549640 B | 6/2014 |
| CN | 205009976 U | 2/2016 |
| DE | 102013201896 A1 | 8/2013 |
| EP | 1555155 A2 | 7/2005 |
| EP | 2674318 A1 | 12/2013 |
| KR | 20100052068 A | 5/2010 |

\* cited by examiner

EXTENSION TUBE INTERNAL CHECK VALVE

CROSS-REFERENCE TO RELATED APPLICATIONS

This application is a continuation of International Application No. PCT/US2015/045056 filed Aug. 13, 2015, which claims the benefit of U.S. Patent Application No. 62/039,014 filed on Aug. 19, 2014 and U.S. Patent Application No. 62/203,699 filed on Aug. 11, 2015. The disclosures of the above applications are incorporated herein by reference.

FIELD

The present disclosure relates generally to check valves for fuel tanks and more particularly to a modular system for positioning the check valve.

BACKGROUND

A vehicle fuel storage system can include a filler tube communicating with a fuel tank. A check valve can be disposed along the filler tube. The check valve allows fuel to enter the fuel tank and prevents fuel from passing out of the fuel tank through the filler tube. The check valve can include a flapper door pivotally mounted on the filler tube.

Vehicle manufacturers develop differently-configured vehicles, resulting in different dimensional arrangements of fuel tanks and filler tubes. Each vehicle can require a filler tube of unique length. However, plastic injection molds are expensive and require a high volume production in order to be economically justified. Further, some desired designs of filler tubes may not be technically feasible because molds cannot open sufficiently to remove the resulting molded part.

The background description provided herein is for the purpose of generally presenting the context of the disclosure. Work of the presently named Inventors, to the extent it is described in this background section, as well as aspects of the description that may not otherwise qualify as prior art at the time of filing, are neither expressly nor impliedly admitted as prior art against the present disclosure.

SUMMARY

A fuel filler tube housing assembly constructed in accordance to one example of the present disclosure includes a fuel filler neck and a filler extension tube. The fuel filler neck housing includes a first mounting structure operable to support a check valve. The fuel filler extension tube is fixed to the fuel filler neck housing and has a second mounting structure substantially similar to the first mounting structure and thereby also operable to support the check valve.

According to additional features, the first mounting structure can include a filler tube mounting collar having a radial mounting ring. The first mounting structure can define a generally D-shaped opening. The filler extension tube can have a terminal end surface opposite the second mounting structure. The terminal end surface can have a cylindrical shape and be configured to engage the radial mounting ring during a welding event.

According to other features, the terminal end surface further comprises a weld bead thereon. The weld bead is merged onto the radial mounting ring. In another example, the weld bead comprises a square cross-section. The fuel filler neck housing and the filler extension tube can be integrally-formed. In one configuration, the fuel filler neck housing and the filler extension tube can be welded together. The fuel filler neck housing and the filler extension tube can be both formed of plastic material. The fuel filler neck housing and the filler extension tube can be one of vibration welded, ultrasonic welded and friction welded. The first mounting structure can further comprise a hook.

A fuel filler tube housing assembly for a vehicle fuel system and constructed in accordance to another example of the present disclosure can include a filler tube assembly, a base, a filler extension tube and a check valve. The filler tube assembly can have a first mounting structure including a first hook. The base can be over-molded about the filler tube assembly. The filler extension tube can be fixed to the filler tube assembly and have a second mounting structure including a second hook substantially similar to the first hook. The check valve can include a pin positionable in either of the first hook and the second hook. A flapper door can be pivotally mountable on the pin. A seal can be mounted on the flapper door. A spring can be positionable to bias the flapper door in one direction of pivotal movement.

According to additional features, the filler extension tube can be plastically welded to the filler tube assembly. The first mounting structure can comprise a filler tube mounting collar having a radial mounting ring. The first mounting structure defines a generally D-shaped opening. The filler extension tube can have a terminal end surface opposite the second mounting structure. The terminal end surface can have a cylindrical shape and be configured to engage the radial mounting ring during a welding event.

According to other features, the terminal end surface can further comprise a weld bead thereon. The weld bead can be merged onto the radial mounting ring. The weld bead can comprise a square cross-section. The filler tube assembly can include a fuel filler neck housing. The filler extension tube can be integrally-formed with the fuel filler neck housing. The fuel filler neck housing and the filler extension tube can be welded together. The fuel filler neck housing and the filler extension tube can both be formed of plastic material. The fuel filler neck housing and the filler extension tube can both be vibration welded, ultrasonic welded and friction welded together.

BRIEF DESCRIPTION OF THE DRAWINGS

The present disclosure will become more fully understood from the detailed description and the accompanying drawings, wherein.

DETAILED DESCRIPTION

Figure 1:
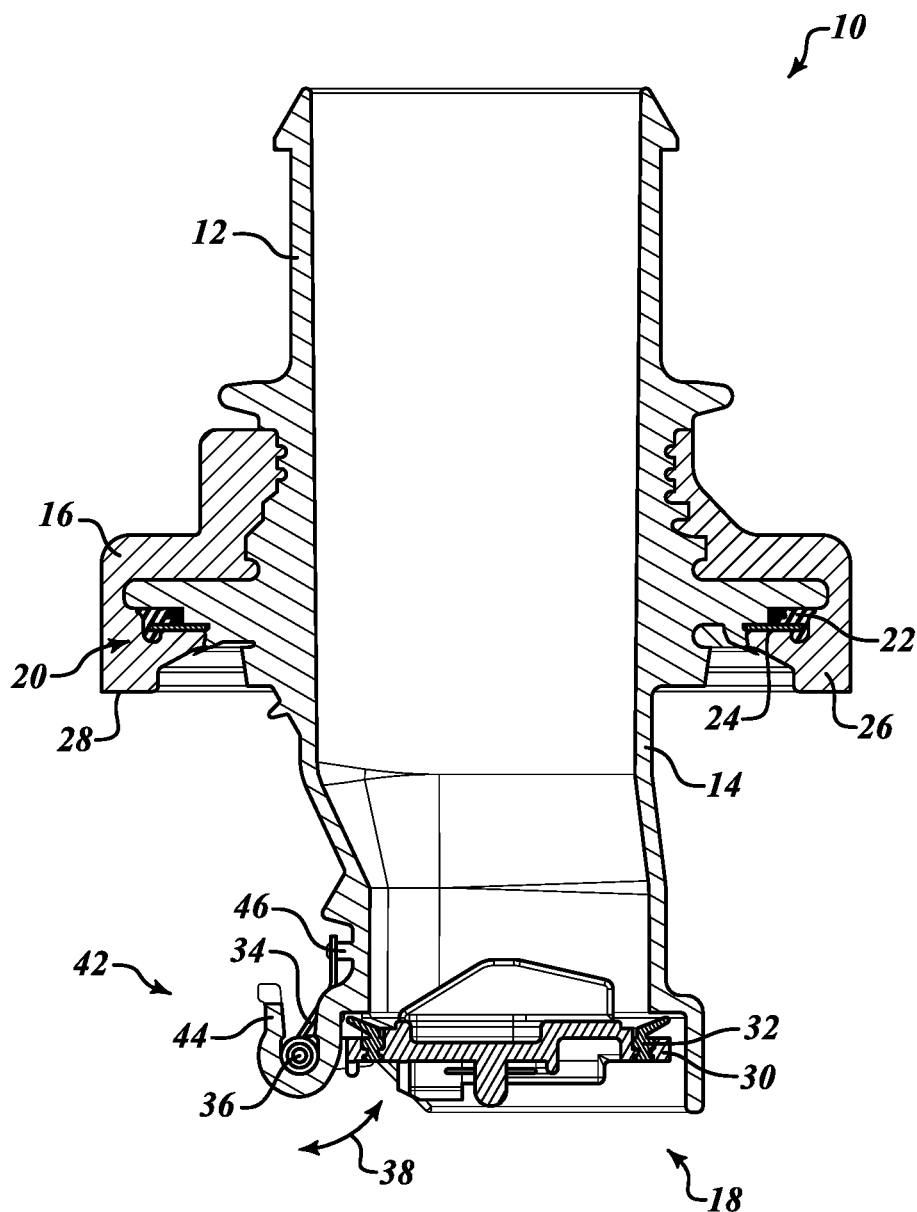
FIG. 1 is a cross-section of a filler tube and internal check valve constructed in accordance to one example of the present disclosure.

The present disclosure provides a modular system with a housing in combination with one or more filler extension tubes of different lengths. A check valve can be mounted on the filler extension tube. The filler extension tube and the housing can be joined together by over molding, or various plastic welding techniques such as vibration welding, ultrasonic welding, or friction welding. The weld joint integrity can be checked through an in-process leak test either before or after the check valve is attached.

Similar features are shown in the various figures of the present disclosure. Similar features have been numbered with a common reference numeral and have been differentiated by an alphabetic suffix. Similar features are structured similarly, operate similarly, and/or have the same function unless otherwise indicated by the drawings or this specification.

Referring now to FIG. 1, a fuel filler neck housing 10 can include a filler spud 12, a valve mount 14, and a base 16 (flange). A fuel hose (not shown) can be mounted over the filler spud 12 and extend to a fuel entry point that is proximate to the exterior of a vehicle. The valve mount 14 can support a check valve 18. The filler spud 12 and the valve mount 14 can be fixed together such as by some form of plastic welding or can be integrally-formed with respect to one another. The base 16 can be over-molded around the filler spud 12 and the valve mount 14. An optional seal 20 can be disposed between the base 16 and the filler spud 12. The seal 20 can include an elastomeric ring portion 22 and a metal support ring portion 24. The base 16 can include a circular leg 26 that can be fixed to a fuel tank (not shown), such as by some form plastic welding, along a surface 28. The valve mount 14 can therefore project into the fuel tank.

The check valve 18 can include a flapper door 30, a seal 32, and a spring 34. The check valve 18 is shown in the closed position in FIG. 1. The flapper door 30 can be a rigid structure and can be mounted to the valve mount 14 for pivoting movement about a pin 36. The pin 36 can be positioned in a mounting fixture 42 defined by the valve mount 14. The mounting fixture 42 can include a hook 44 receiving the pin 36, however it is noted that a mounting fixture in other examples of the present disclosure can take other forms. A mounting fixture in other examples of the present disclosure need not include a hook or a pin. The pivoting movement is referenced by arrow 38. The seal 32 can be mounted on the flapper door 30 and seal against the valve mount 14. The spring 34 can bias the flapper door 30 to the closed position, as shown in FIG. 1. The spring 34 can include one end fixed to a feature 46 of the mounting fixture 42. Feature 46 can be half of a pair of ribs that protect the spring 34 from being mislocated to other ICVs during bulk packing rather being a mounting feature. The ramp just above feature 46 can protect the spring tail from shipping damage.

Figure 2:
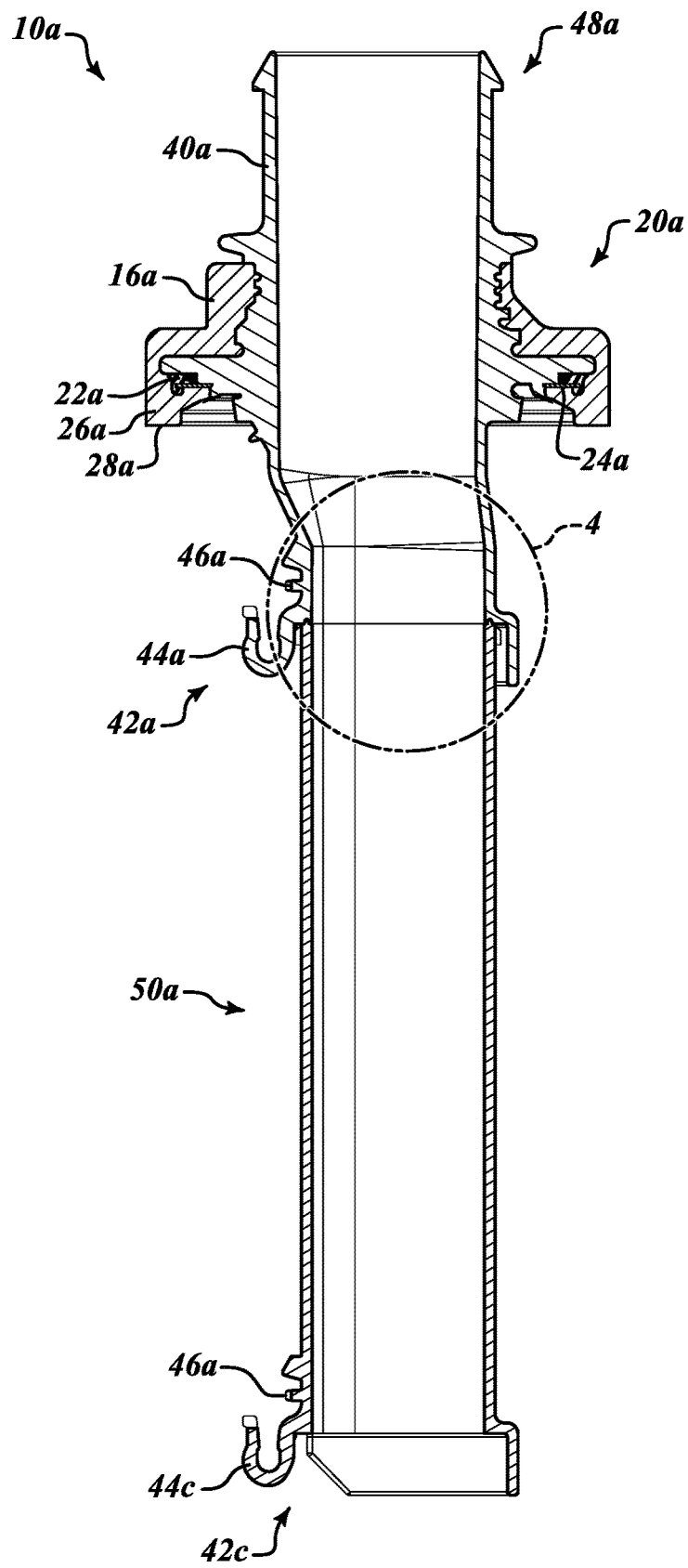
FIG. 2 is a cross-section of a filler tube constructed in accordance to another example of the present disclosure.
Figure 3:
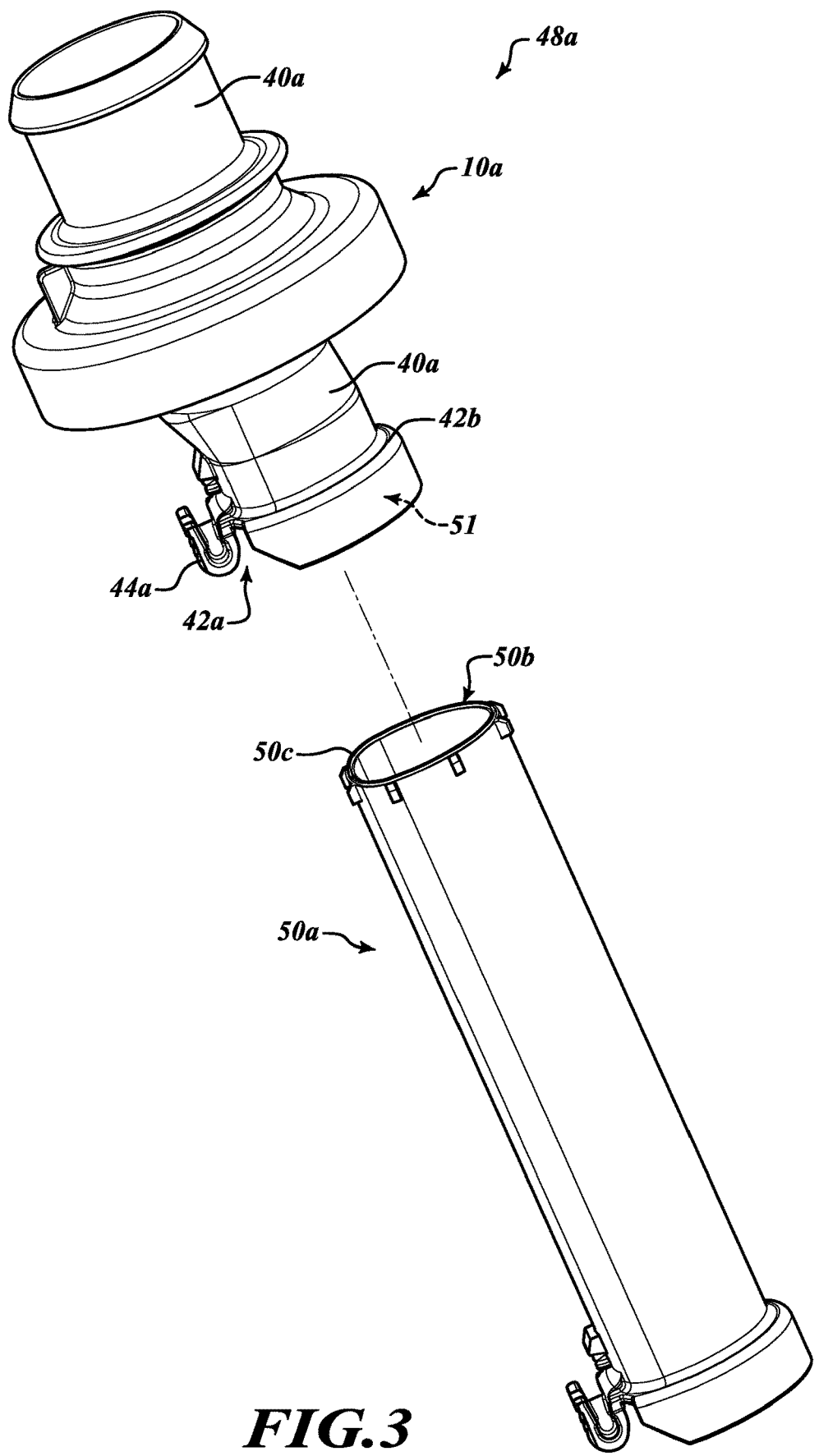
FIG. 3 is an exploded view of the filler tube shown in FIG. 2.

Referring now to FIG. 2, a fuel filler neck housing 10a can include a filler tube assembly 40a and a base 16a. The filler tube assembly 40a can be an integrally-formed version of a filler spud and a valve mount. The base 16a can be over-molded around the filler tube assembly 40a. An optional seal 20a can be disposed between the base 16a and the filler tube assembly 40a. The seal 20a can include an elastomeric ring portion 22a and a metal support ring portion 24a. The base 16a can include a circular leg 26a that can be fixed to a fuel tank (not shown), such as by some form plastic welding, along a surface 28a. A portion of the filler tube assembly 40a can therefore project into the fuel tank. The filler tube assembly 40a can include a mounting structure 42a operable to support a check valve, such as a check value similar to the check valve 18 shown in FIG. 1. The mounting structure 42a can include a hook 44a.

A fuel filler tube housing assembly 48a can include the fuel filler neck housing 10a and a filler extension tube 50a.

The filler extension tube 50a can extend any desired length. The filler extension tube 50a can be fixed to the fuel filler neck housing 10a such as by some form of plastic welding. The filler extension tube 50a can be fixed to the filler tube assembly 40a at the mounting structure 42a. Specifically, the mounting structure 42a can have a filler tube mounting collar 42b that includes a radial mounting ring 53. The filler extension tube 50a can have a generally round terminal end surface 50b that defines an outer diameter 50c. The terminal end surface 50b of the extension tube 40a is received into a generally D-shaped opening 51 provided on the mounting structure 42a of the filler tube assembly 40a. The terminal end surface 50b generally engages the radial mounting ring 53 during a welding event to couple the filler extension tube 50a to the mounting structure 42a of the housing 10a.

Figure 4:
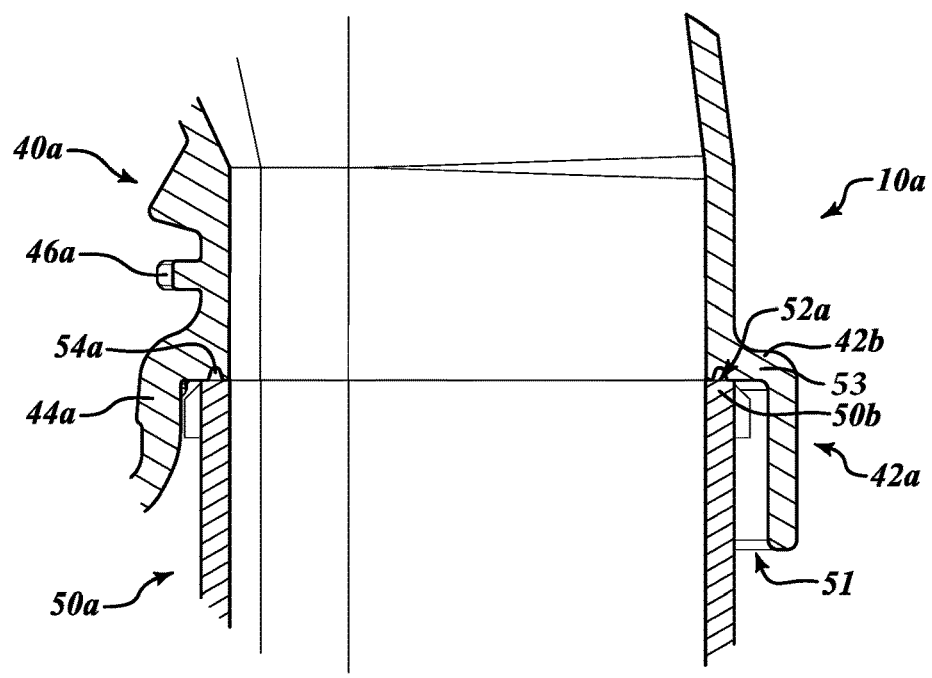
FIG. 4 is a detail view taken from FIG. 2 indicating U-shaped sacrificial excess material required for plastic welding.

As shown in FIG. 4, a weld bead 52a of the filler extension tube 50a can be received in a groove 54a. Those skilled in the art will appreciate that while the mating surfaces are represented as a groove 54a on the filler mounting collar 42b and a bead 52a on the terminal end surface 50b of the filler extension tube 50a, the filler mounting collar 42b is generally flat at the radial mounting ring 53. The weld bead 52a and the groove 54a are shown to represent a merging or melting of plastic during welding. The weld bead 52a is generally melted or merged onto the radial mounting ring 53 of the fuel filler mounting collar 42a. Explained further, the surfaces of the filler extension tube 50a and the filler tube mounting collar 42b that engage (the terminal end surface 50b of the filler extension tube 50a and the radial mounting ring 53 of the housing 10a) are melted together during a welding process. The welds may be vibration welds, sonic welds or other welds as described above.

Figure 5:
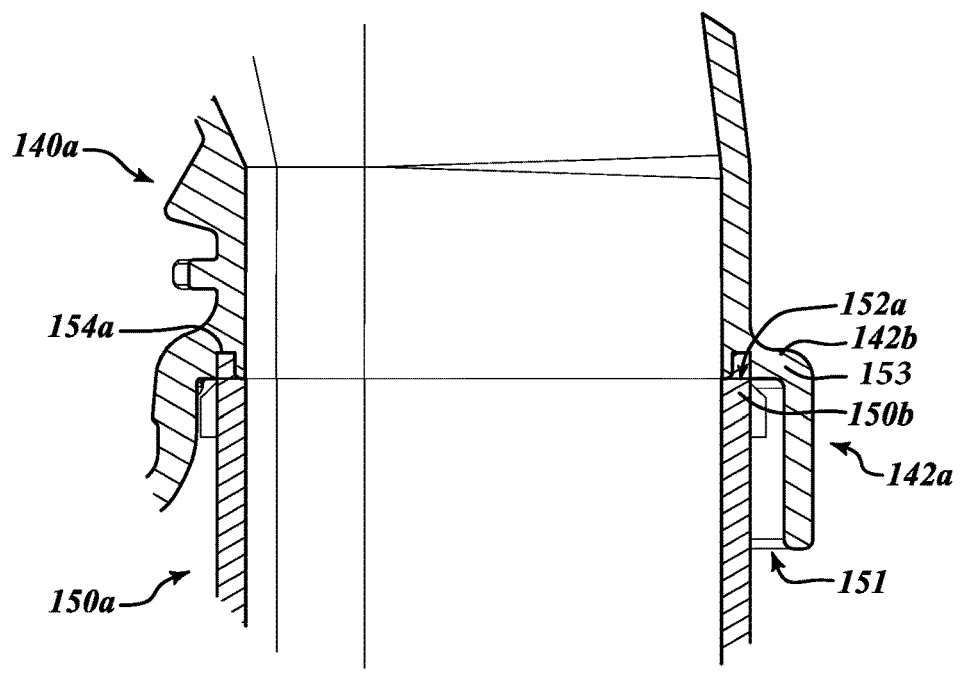
FIG. 5 is a detail view of an alternative to the detail shown in FIG. 4 also indicating rectangular sacrificial excess material required for plastic welding.

FIG. 5 shows another example where similar features are identified by a 100 suffix. FIG. 5 shows an alternatively-structured weld bead 152a of a filler extension tube 150a can be received in a groove 154a (or a flat surface as described below) defined by the filler tube assembly 140b to facilitate welding. The filler extension tube 150a can extend any desired length. The filler extension tube 150a can be fixed to a housing 110a such as by some form of plastic welding. The filler extension tube 150a can be fixed to the filler tube assembly 140b at the mounting structure 142a. Specifically, the mounting structure 142a can have a filler tube mounting collar 142b that includes a radial mounting ring 142c. The filler extension tube 150a can have a generally round or cylindrical terminal end surface 150b that defines an outer diameter 150c. The terminal end surface 150b of the extension tube is received into a generally D-shaped opening 151 provided on the mounting structure 142a of the filler tube assembly 140a. The terminal end surface 150b generally engages the radial mounting ring 142c during a welding event to couple the filler extension tube 150a to the mounting structure 142a of the housing 110a.

As shown in FIG. 5, a weld bead 152a of the filler extension tube 150a can be received in a groove 154a. Those skilled in the art will appreciate that while the mating surfaces are represented as a groove 154a on the filler mounting collar 142b and a bead 152a on the terminal end surface 150b of the filler extension tube 150a, the filler mounting collar 142b is generally flat at the radial mounting ring 153. The weld bead 152a and the groove 154a are shown to represent a merging or melting of plastic during welding. The weld bead 152a is shown having a generally square cross-section and is generally melted or merged onto the radial mounting ring 153 of the filler mounting collar. Explained further, the surfaces of the filler extension tube 150a and the filler tube mounting collar 142b that engage (the terminal end surface 150b of the filler extension tube 150a and the radial mounting ring 153 of the housing 110a) are melted together during a welding process. The welds may be vibration welds, sonic welds or other welds as described above. The filler extension tube 50a can include a mounting structure 42c operable to support a check valve, such as a check value similar to the check valve 18 shown in FIG. 1. The mounting structure 42c can include a hook 44c and a feature 46c. The mounting structure 42c can be substantially similar to the mounting structure 42a such that a particular check valve could be mounted in either the mounting structure 42a (if filler extension tube 50a were not attached to the filler tube assembly 40b) or the mounting structure 42c. Thus, the length of filler extension tube 50a can be easily adjustable by forming the filler extension tube 50a in a mold with one or more mold inserts. A fixed portion of the mold forming the mounting structure 42c could be assembled to one or more mold inserts, each insert utilized to form a length of the tubular portion of the filler extension tube 50a. Another fixed portion of the mold could be utilized to form the end of the filler extension tube that mates with a valve mount or a filler tube assembly 40a.

Examples of the present disclosure can include one or more filler extension tubes. Each filler extension tube could be welded to one or more, other filler extension tubes to achieve a desired length of filler tube. Alternatively, a single filler extension tube of desired length could be formed and attached to a housing. In this regard, the filler extension tube can be configured having any length suitable for a particular application.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A fuel filler tube housing assembly for a vehicle fuel system, the fuel filler tube housing assembly consisting of:
   a filler tube assembly having a first mounting structure having a filler tube mounting collar including a radial mounting ring, the first mounting structure including a first hook in a first mounting configuration;
   a base over-molded about the filler tube assembly;
   a filler extension tube selectively fixed to the filler tube assembly in a second mounting configuration and having a second mounting structure including a second hook substantially similar to the first hook; and
   a single check valve including a pin positionable in either of the first hook and the second hook, a flapper door pivotally mountable on the pin, a seal mounted on the flapper door, and a spring positionable to bias the flapper door in one direction of pivotal movement;
   wherein the single check valve is selectively and alternatively mounted to the first mounting structure without the filler extension tube in the first mounting configuration and to the second mounting structure with the filler extension tube in the second mounting configuration, wherein in the second mounting configuration a terminal end surface of the filler extension tube is plastically welded to the radial mounting ring, wherein the filler extension tube has a length specifically configured to locate the check valve at a desired location away from the first mounting structure to accommodate a given vehicle application in the second mounting configuration.

2. The fuel filler tube housing assembly of claim 1 wherein the first mounting structure defines a generally D-shaped opening.

3. The fuel filler tube housing assembly of claim 2 wherein the terminal end surface is located opposite the second mounting structure, the terminal end surface having a cylindrical shape and configured to engage the radial mounting ring during a welding event.

4. The fuel filler tube housing assembly of claim 3 wherein the terminal end surface further comprises a weld bead thereon, wherein the weld bead is merged onto the radial mounting ring.

5. The fuel filler tube housing assembly of claim 4 wherein the weld bead comprises a square cross-section.

6. The fuel filler tube housing assembly of claim 1 wherein the fuel filler neck housing and the filler extension tube are both formed of plastic material and are one of vibration welded, ultrasonic welded and friction welded together.

* * * * *